May 8, 1934. M. W. BOWMAN 1,957,522
ICE CREAM FREEZER FOR ELECTRIC ICE BOXES
Filed April 27, 1932 2 Sheets-Sheet 1
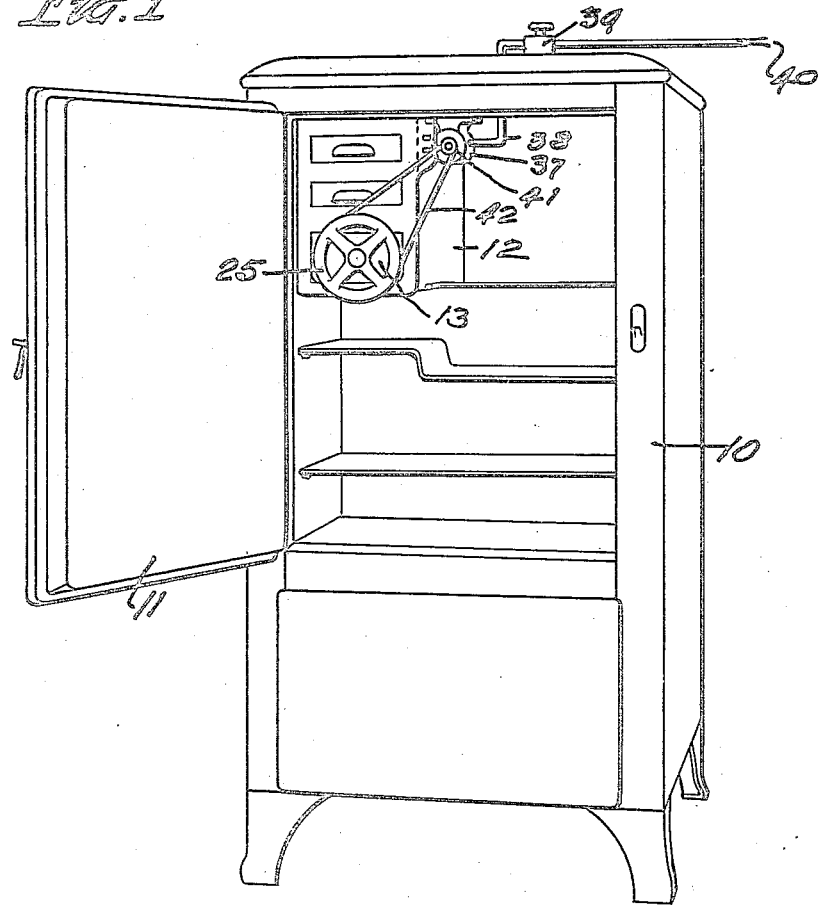
INVENTOR
Morris W. Bowman
by J. H. Weatherford
Atty.

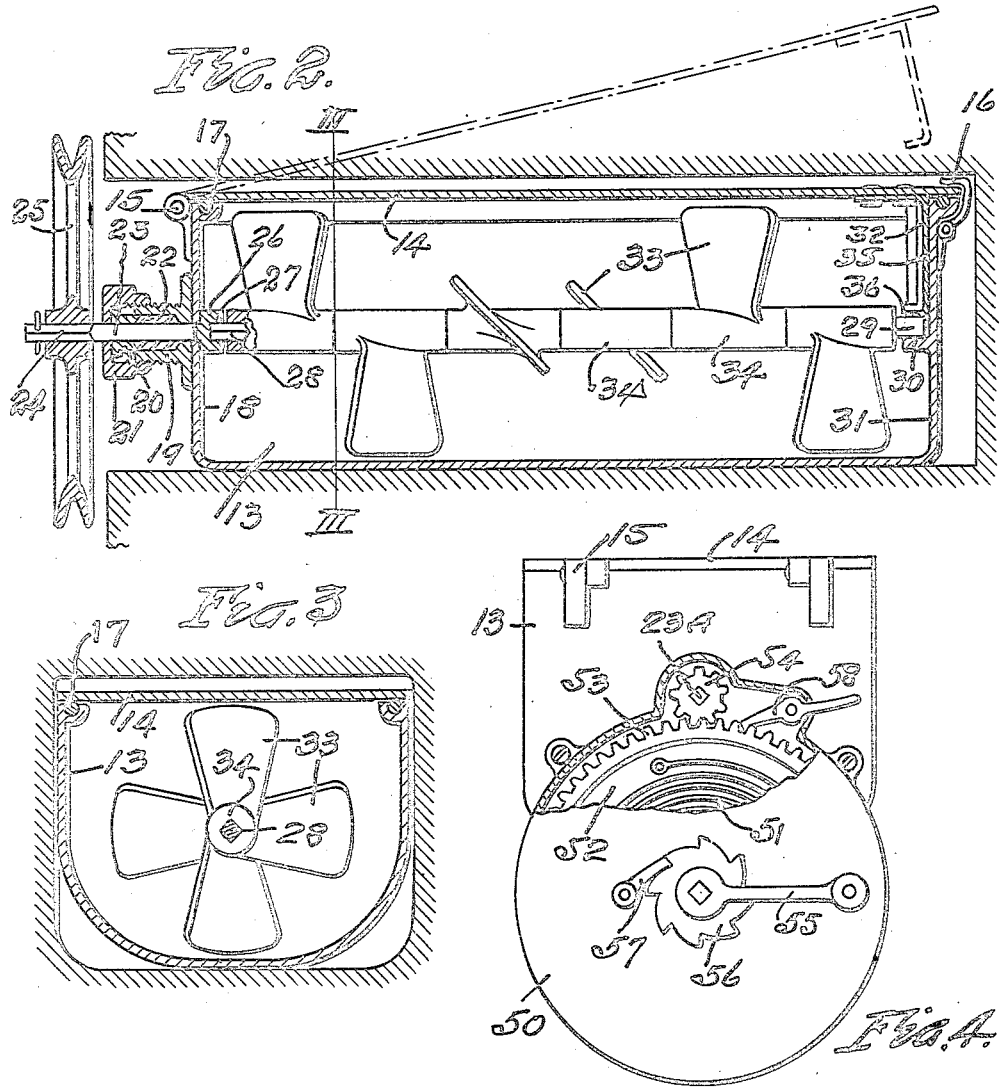

Patented May 8, 1934

1,957,522

UNITED STATES PATENT OFFICE 1,957,522

ICE CREAM FREEZER FOR ELECTRIC ICE-BOXES

Morris W. Bowman, Memphis, Tenn.

Application April 27, 1932, Serial No. 607,693

1 Claim. (Cl. 259—110)

This invention relates to a device for use in connection with an electric box or refrigerator for the purpose of freezing ice creams, sherbets or other similar desserts.

Modern electric refrigerators are equipped with shallow trays for the freezing of ice cubes and with a much deeper tray which is used in making frozen desserts of various kinds.

It is found however, in the case of ice cream, sherbets and many other desserts that there is a tendency for some of the ingredients to settle and others to rise, or otherwise separate, effectually spoiling the article and that even where such separation does not occur there is a tendency for certain portions of the mixture usually the water contained therein, to freeze first, causing undesirable flaking of the dessert.

The object of the present device is primarily to provide a freezing tray including means for agitating the mass to be frozen during such portion of the freezing time as may be necessary or desired.

A further object of the invention is to improve the details of design and construction of a device for accomplishing this purpose.

The means by which the foregoing and other objects are accomplished and the manner of their accomplishment will readily be understood from the following specification by reference to the accompanying drawings, in which:

Fig. 1 is a perspective view of an electric refrigerator with the front door open, showing the instant device installed therein and showing a small auxiliary electric motor for actuating the mechanism;

Fig. 2 is a sectional elevation, taken along the longitudinal center line of the freezer tray;

Fig. 3 is a transverse sectional elevation taken as on the line III—III of Fig. 2; and Fig. 4 is a front elevation showing a modified form of mechanism for actuating the stirring device.

Referring now to the drawings, in which the various parts are indicated by numerals, 10 is a refrigerator case shown with the door 11 open. In the upper left hand corner is the usual chilling and ice freezing unit 12, having compartments in which are disposed the usual shallow trays for freezing ice cubes and a larger compartment in which the present device is disposed.

The device comprises an elongated tray 13 the top of which is closed by a cover 14, hinged as by a hinge 15, preferably at the forward end, and secured in place as by a latch 16 at the rear end.

The cover 14 when closed and secured by the latch 16 makes a tight fit. Preferably a gasket 17 is used to accomplish the tightness of the joint.

The tray including its cover is adapted to be slid easily into and removed from the compartment, conforming reasonably closely to the same except that preferably the lower corners of the tray are rounded on a longer radius than that usually employed in the compartment.

Secured to the front end 18 of the tray preferably at its exact center and projecting forwardly therefrom is a stuffing box 19, having a gland 20, gland retaining nut 21 and packing 22. Disposed in the stuffing box is a short shaft 23 one end of which 24 projects outwardly beyond the stuffing box and is preferably squared to receive the hub of a grooved pulley 25. The other end of the shaft projects within the tray and has thereon a collar 26 which is preferably provided with a square socket 27. Removably disposed within the tray is a shaft 28 preferably square and in any event, having its forward end complementary to, and adapted to seat in, the socket 27. The rear end of the shaft has a cylindrical portion 29 adapted to seat and turn in a socket 30 formed in the rear end 31 of the tray. A vertical groove 32 is formed in such rear end leading downward to the socket 30.

Mounted on the shaft 28 are a plurality of blades 33 which may be integrally secured thereto. Preferably however, each blade has an individual hub 34 to which it is secured, the hubs being bored out to receive the shaft, and provided the shaft is square, having a square hole therethrough whereby turning of the shaft will rotate the blades. The blades are preferably each a portion of a helix. Preferably there are an even number of the blades, half of which are of right hand pitch, and half of left hand pitch.

Secured to the underside of the cover 14 and projecting downwardly therefrom is a flexible member 35 carrying at its lower end a hollowed out lug 36 which is adapted to seat on top of the shaft end when the cover is latched down, and to form a cap to hold that end of the shaft in the socket 30. The width of the flexible member 35 conforms to the width of the groove 32 so that when the cover 14 is being closed it will slide downwardly in, and be directed to place by, the groove.

The stirrer preferably is driven by a small electric motor 37, the current wires for the motor being led outside of the box 10, as through a conduit 38, to a suitable control switch 39, and power circuit 40. Mounted on the shaft of the motor 37 is a grooved pinion 41 which is connected by a belt 42 with the pulley 25 for driving the same.

In Fig. 4, a spring motor 50 is provided to drive the shaft in lieu of the electric motor. In this motor a spring 51 is connected to the web 52 of a gear having teeth 53. These teeth mesh with the teeth of a pinion 54 mounted on a shaft 23A substantially identical with the shaft 23. 55 is a handle for winding the spring motor, 56 the usual ratchet wheel, and 57 the retaining pawl. A dog 58 is engaged with the gear teeth 53 to hold the gear during winding and until released to permit use of the motor. The details of such a motor being well known it is not deemed necessary to further illustrate them.

In making use of the device the tray is removed from its compartment and the dessert to be frozen is placed therein. The cover is then pushed down and latched in place, the flexible member 35 sliding down the groove and seating on the rear end of the shaft. The tray is placed in the compartment and the belt placed on the grooved pulley of the tray and pinion of the motor. After the refrigerator door is closed the electric motor may be started to actuate the agitating paddles and this agitation may be kept up until freezing of the dessert progresses to such point that flaking or separation ceases or until further stirring is impracticable, at which time the motor is cut off and any further freezing, allowed to proceed without agitation.

In the case of the spring motor the spring is tightly wound before placing the tray in the refrigerator. After placing, chilling is preferably allowed to proceed until solidification is about to begin, at which time the dog 58 is released and the spring motor allowed to actuate the paddles.

In emptying the tray, the agitator is removed with the content, and after its removal therefrom is accessible for cleaning or sterilization.

The rounding of the bottom corners of the tray not only facilitate cleaning but also bring the materials closer to the zone of action of the agitator, and as well direct it into such zone.

It will of course be understood that in case the speed of the electric motor cannot be sufficiently reduced by direct drive, that some of the well known forms of reduction gearing may be interposed between the motor and the agitator shaft.

It will also be understood that the spring motor is merely intended to typify an additional type of motor which may be directly connected, or connected as by the belt shown in connection with the electric motor, to drive the agitating paddles.

Having described my invention, what I claim is:

In a freezer of the character described, a tray including front and back ends and having an open top, said front end having a centrally located aperture therethrough, a shaft journalled through said aperture and extending beyond said tray, a driving member mounted on the exterior end of said shaft, a coupling member on the opposite end of said shaft and within said tray; said tray back end having an upwardly turned semi-cylindrical shaft socket formed on the inner side thereof, a shaft carrying agitator blades thereon, having one end complementary to and adapted to engage and be carried by said coupling member and the other end cylindrical and adapted to seat in said socket, a lid for said tray, means hingedly attaching the forward end of said lid to said tray, a flexible arm depending from the opposite end of said lid, said arm carrying an integral lug adapted to seat on said cylindrical shaft end, means for releasably securing the arm end of said lid to said tray to seal same and hold said shaft in place, a motor and means connecting said motor and driving means.

MORRIS W. BOWMAN.